(12) United States Patent
Iqbal et al.

(10) Patent No.: US 11,874,416 B2
(45) Date of Patent: Jan. 16, 2024

(54) METHOD FOR DISTRIBUTING ENERGY HARVESTING GEOPHONES

(71) Applicant: KING FAHD UNIVERSITY OF PETROLEUM AND MINERALS, Dhahran (SA)

(72) Inventors: Naveed Iqbal, Dhahran (SA); Mudassir Masood, Dhahran (SA); Ali Arshad Nasir, Dhahran (SA); Khurram Karim Qureshi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 33 days.

(21) Appl. No.: 17/985,581

(22) Filed: Nov. 11, 2022

(65) Prior Publication Data

US 2023/0367026 A1    Nov. 16, 2023

Related U.S. Application Data

(62) Division of application No. 17/745,157, filed on May 16, 2022, now Pat. No. 11,513,246.

(51) Int. Cl.
*G01V 1/18* (2006.01)
*G01V 1/16* (2006.01)

(52) U.S. Cl.
CPC ............. *G01V 1/181* (2013.01); *G01V 1/162* (2013.01); *G01V 1/164* (2013.01); *G01V 1/166* (2013.01)

(58) Field of Classification Search
CPC ........ G01V 1/181; G01V 1/162; G01V 1/164; G01V 1/166
See application file for complete search history.

(56) References Cited

U.S. PATENT DOCUMENTS 8,400,162 B1   3/2013   Jannson
8,532,724 B2   9/2013   Cook
(Continued)

FOREIGN PATENT DOCUMENTS

EP    2610935 A    7/2013

OTHER PUBLICATIONS

Nicholas S. Hudak and Glenn G. Amatucci , "Small-scale energy harvesting through thermoelectric, vibration, and radiofrequency power conversion", Journal of Applied Physics 103, 101301 (2008) (Year: 2008).*

(Continued)

*Primary Examiner* — Ian J Lobo
(74) *Attorney, Agent, or Firm* — Oblon, McClelland, Maier & Neustadt, L.L.P.

(57) ABSTRACT

A method for distributing geophones around a seismic data source includes distributing a first geophones each including a first piezoelectric system in a first region in which the seismic data source is located then distributing second geophones each including a solar cell in a second region surrounding the first region. The second geophones further include a housing, a spike provided on a bottom surface of the housing, a sensor configured to sense seismic data; a processor configured to process the seismic data, a transceiver configured to transmit the processed seismic data and receive radio frequency (RF) signals wirelessly; and a power device. The power device is coupled to the sensor, the processor and the transceiver. The power device is configured to harvest energy from an environment where the geophone is located. The power device includes a solar cell provided on a top surface of the housing, a piezoelectric system provided on an edge of the housing adjacent to the top surface, and a thermoelectric generator provided on a bottom surface of the housing and a surface of the spike.

16 Claims, 9 Drawing Sheets

(56) References Cited

U.S. PATENT DOCUMENTS

| | | |
|---|---|---|
| 10,416,252 B2 | 9/2019 | Liu |
| 10,985,677 B2 | 4/2021 | Boyd |
| 11,159,048 B2 | 10/2021 | Sato |
| 2008/0129147 A1 | 6/2008 | Thiesen et al. |
| 2010/0039892 A1 | 2/2010 | Ray |
| 2015/0136220 A1 | 5/2015 | Kranz |
| 2015/0229242 A1 | 8/2015 | Chimamkpam |
| 2019/0178710 A1 | 6/2019 | Ahmed et al. |
| 2021/0351335 A1 | 11/2021 | Boyd |

OTHER PUBLICATIONS

Kang, et al. ; Multi-Source Energy Harvesting for Wireless Sensor Nodes ; Royal Institute of Technology ; Aug. 19, 2017 ; 64 Pages.

Makama, et al. ; Wireless Geophone Networks for Land Seismic Data Acquisition: A Survey, Tutorial and Performance Evaluation ; Sensors, 21 ; Jul. 30, 2021 ; 22 Pages.

Carreras et al., "Piezoelectric energy harvesting system for volcanic seismic acquisition equipment", Sixth International Workshop on Marine Technology, Martech 2015, Cartagena, Sep. 15th, 16th and 17th—ISBN: 978-84-608-1708-6 (Year: 2015).

\* cited by examiner

METHOD FOR DISTRIBUTING ENERGY HARVESTING GEOPHONES

CROSS-REFERENCE TO RELATED APPLICATIONS

The present application is a Division of U.S. application Ser. No. 17/745,157, now allowed, having a filing date of May 16, 2022.

BACKGROUND

Technical Field

The present disclosure is directed to energy harvesting techniques for wireless geophones.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A seismic survey is an important tool for exploring subsurface mineral deposits, volcanic monitoring, landslide monitoring, monitoring of glaciers, underground tomography, and earthquake prediction. The seismic survey is performed by sending seismic waves into the deep subsurface of the Earth and recording the reflected and refracted waves as seismic data. The acquisition of seismic data requires special devices such as vibration trucks and geophones. After processing and analyzing the acquired data, the seismic survey is configured to provide an insight into the geological structure of the Earth without using any costly drilling methods.

For performing a seismic survey, a network of sensors called "wireless geophones" is deployed in a survey area that is connected to a center communication point for communicating data. To perform several activities, such as sensing, analyzing, and transmitting the seismic data, the wireless geophone requires power in bulk. Oil and gas operators are focusing on increasingly complex hydrocarbon reservoirs that are often difficult to image. Such targets require increasing amounts of data in order to acquire the most accurate possible image of the subsurface. To meet a growing need and demand for massive volumes of data, the wireless geophone needs to be supplied with sufficient power to perform all the required functions.

Power can be supplied to wireless geophones in a number of ways. In some embodiments, the wireless geophones are directly connected to a cable for receiving power. In some cases, various wireless geophones are inductively or capacitively coupled to the cable to receive power without being directly wired to the backbone. However, this approach causes disadvantages such as excess weight, reliability issues, complexities in deployment and maintenance, human resource costs, and other operational costs. As cables are prone to damage by stress, this may result in more frequent downtime of the seismic survey.

To override the above limitations, a battery-powered wireless geophone was developed. However, conventionally available technology includes a battery-powered wireless geophone that weighs 2.77 lbs, whereas its battery weighs 2.4 lbs. This means that 86% of the weight of the wireless geophone is contained by the battery. The battery may need to be recharged/replaced frequently based on usage, thereby creating a serious limitation in performing the seismic survey in which many battery-powered geophones are to be maintained. Replacement of batteries can be cumbersome and time-consuming, which may affect the seismic acquisition process.

Hence, there is a need for a wireless geophone that is capable to employ energy harvesting schemes, such that a self powered and efficient wireless geophone can be achieved.

SUMMARY

In an exemplary embodiment, a geophone is disclosed. The geophone includes a housing, a spike provided on a bottom surface of the housing, a sensor provided inside the housing, the sensor configured to sense seismic data; a processor provided inside the housing and coupled to the sensor, the processor configured to process the seismic data; a transceiver provided inside the housing and coupled to the processor, the transceiver configured to transmit the processed seismic data and receive radio frequency (RF) signals wirelessly; and a power device coupled to the sensor, the processor and the transceiver. The power device is configured to harvest energy from an environment where the geophone is located to power the sensor, the processor and the transceiver. The power device includes a solar cell provided on a top surface of the housing, a piezoelectric system provided on an edge of the housing adjacent to the top surface; and a thermoelectric generator provided on the bottom surface of the housing and a surface of the spike.

In another exemplary embodiment, a method for distributing geophones around a seismic data source is disclosed. The method includes distributing one or more first geophones in a first region in which the seismic data source is located, each of the first geophones including a piezoelectric system; and distributing one or more second geophones in a second region surrounding the first region, each of the second geophones including at least one of a solar cell and a thermoelectric generator.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
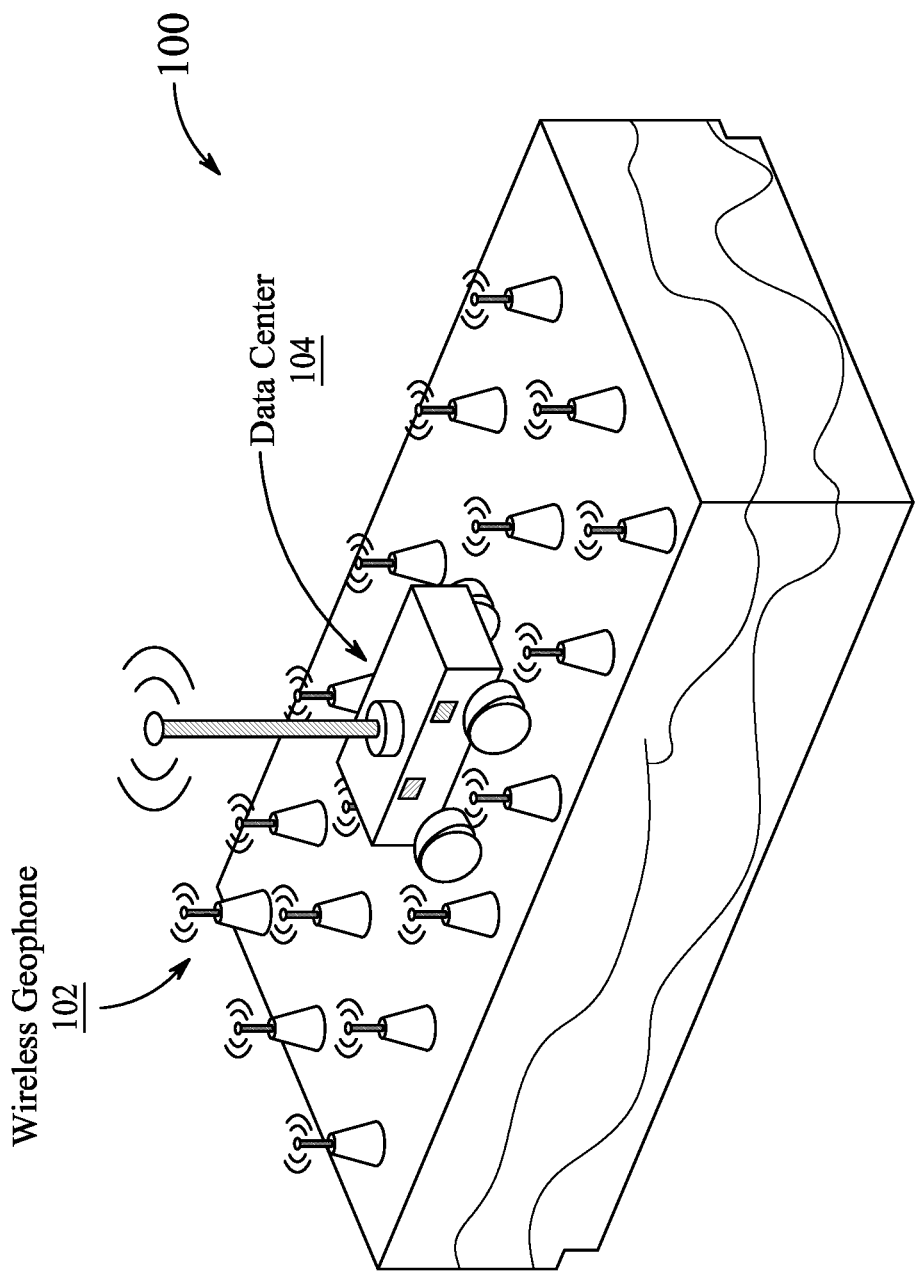
FIG. 1 is a perspective view of a wireless seismic network, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a geophone and a method for distributing a plurality of geophones around a seismic data source. The present disclosure discloses a self-powered geophone that is configured to employ at least one energy harvesting scheme for converting ambient energy to electrical energy consumed by the geophone. An energy harvesting equipped geophone eliminates the need for power cables, which account for the biggest portion of a seismic survey's cost. Numerous energies are abundantly available in seismic fields. These can be harvested to power geophones. However, due to the random and intermittent nature of the harvested energy, it is important that the geophone be equipped to tap into several energy sources for stable operation. The presently disclosed geophone and geophone seismic system are cost-effective and beneficial as the sources for energy harvesting are available naturally.

The present disclosure provides several energy harvesting schemes that are suitable for direct adaptation to the geophone. Specifically, small form factor energy harvesting circuits and systems capable of harvesting energy from wind, sun, vibrations, temperature difference, and radio frequencies are preferred. Furthermore, several experiments were performed to assess and demonstrate the suitability of the studied energy harvesting schemes.

Using the energy harvesting schemes for seismic applications makes it possible to provide a wireless geophone and geophone system/network that is fully self-sustaining, reliable, and eliminates the need for batteries and battery maintenance. The present disclosure is configured to use electrical energy for operating the geophone, which may be obtained by tapping energy from ambient electromagnetic fields (using radio frequency (RF)), vibrations, sunlight, wind, and temperature gradients. These various sources of energy are abundantly available in seismic fields. Hence, the harvested energy may be used to power a geophone directly and/or charge a small battery (or a supercapacitor connected to the geophone). The present disclosure also analyses the various sources of energy and the duration of their availability. For example, energies obtained using RF and temperature gradients (thermal) are available all day, so even if there is no seismic recording, these energies are still available and can be used to recharge the geophone batteries. Wind energy harvesting depends on the speed of the wind, but in general, it is available all the time. In the seismic fields, a vibroseis truck (used to produce seismic waveform) generates a tremendous amount of vibration energy that can be used for vibration energy harvesting. Furthermore, the vibration energy is available only during seismic shooting phases. Therefore, at least one storage device on the geophone may be configured for continuous energy storage using available energy harvesting source(s), and the stored energy is then used for performing activities such as seismic recording and data transmission. During normal operation of the geophone the energy harvesting system functions, in the seismic field, to harvest energy during peak times of energy availability, while the storage device provides needed power during times of peak energy demand and/or specified periods.

The geophone employed with energy harvesting with regards to the seismic acquisition networks provides benefits such as long-lasting operability, no chemical disposal (avoids environmental contamination), cost-saving, safety, maintenance-free, no charging points, inaccessible sites operability, flexibility, scalability, ease of installation, increased lifetime, and complete removal of supply wires.

In various aspects of the disclosure, non-limiting definitions of one or more terms that will be used in the document are provided below.

The term "energy harvesting (EH)" may be defined as a process wherein the sources such as mechanical load, vibrations, temperature gradients, and light, etc., are scavenged and converted to obtain relatively small levels of power.

The term "seismic shot" may be defined as an event of initiation of seismic waves in the rocks or subsurface of the Earth by a seismic data source at a known point.

The term "geophone" may be defined as a device that converts ground movement (velocity) into voltage or other electromagnetically detectable signal, which may be recorded at a recording station. The deviation of this measured voltage from a base line is called the seismic response and is analyzed for subterranean structure of the Earth.

FIG. 1 describes a perspective view of a wireless seismic network (hereinafter interchangeably referred to as "the network 100"), according to aspects of the present disclosure. Referring to FIG. 1, the wireless seismic network 100 includes a plurality of wireless geophones 102 (hereinafter interchangeably referred to as "the geophone 102"), and a data center (or a seismic data source) 104.

The geophones 102 are configured to sense the seismic signals and record the sensed seismic signals. Each of the geophones 102 mainly includes two main modules; namely, a data acquisition module and a communication module (not shown). The data acquisition module is configured to record the reflected and/or refracted seismic signals and to process the recorded seismic signals to generate seismic data. The communication module is used to communicate the generated seismic data to the data center 104.

The data center 104 is configured to receive the transmitted seismic data from the geophones 102 and process the received data by translating the received data into usable information. The data center 104 is further configured to store the processed data. In an aspect, the data center 104 may include a processor, a memory, one or more storage devices, and input/output interfaces/devices. In some embodiments, the data center 104 may only perform storage function and interface with other systems for processing. In an embodiment, the data center 104 comprises an electronic computing device operable to receive, transmit, process, store, or manage data and information associated with the wireless seismic network 100.

The data center 104 includes an electronic circuit for filtering and amplification of the received seismic data. In an embodiment, the data center 104 is configured to perform signal denoising, detailed analysis, and based on the results of the analysis, a warning is provided to a corresponding authority.

In an aspect, the data center 104 acts as a seismic data source, configured to generate and broadcast Radio Frequency (RF) signals (seismic signals) of predetermined frequencies towards the surface of the Earth. The data center 104 is configured to use RF signals for communicating/conveying a number of actions to the plurality of geophones 102. For example, the number of actions may be selected from a group of activating the geophones, requesting the geophones for transmitting the seismic data, acknowledging safe receipt of the transmitted seismic data, and scheduling working of the geophones according to time, availability, data channels, residual power associated with each geophone or a combination thereof. Due to different strata of the Earth, the broadcasted seismic signals are refracted and reflected. The seismic surveys are performed by using the refracted and reflected seismic signals. In some examples, the data center 104 may be a truck-mounted or buggy-mounted device that introduces RF signals having vibrations/frequencies into the Earth. For example, the data center 104 may be a vibrator truck, a vibroseis truck, an air gun, a thumper truck, a plasma sound source, and/or a seismic vibrator boomer source. In an aspect, the data center 104 may provide seismic signals having single pulses of frequencies or continuous sweeps of the frequencies.

In an aspect, each geophone 102 is configured to tap/utilize the RF signals generated by the data center 104. In the seismic acquisition process, the geophone 102 transmits the acquired seismic data to the data center 104 via an uplink channel, in response of which the data center 104 sends acknowledgments in form of small frames towards the transmitting geophones 102. The data center 104 is configured to transit the small frames via a downlink channel. Since the downlink channel is idle most of the time, providing a situation where the plurality of geophones 102 is able to harvest energy from the RF signals transmitted from the data center 104 as disclosed in the present disclosure.

To employ RF harvesting, the data center 104 may be configured to generate special signals that are meant for energy harvesting and transmit the same over the downlink channel towards the plurality of geophones 102. The plurality of geophones 102 is configured to generate electrical power by employing RF energy harvesting using the transmitted RF signals. In an aspect, the geophones 102 may be configured to use the transmitted RF signals during both the shooting interval and the non-shooting periods, thereby can be used to power up geophones at any time.

Figure 2:
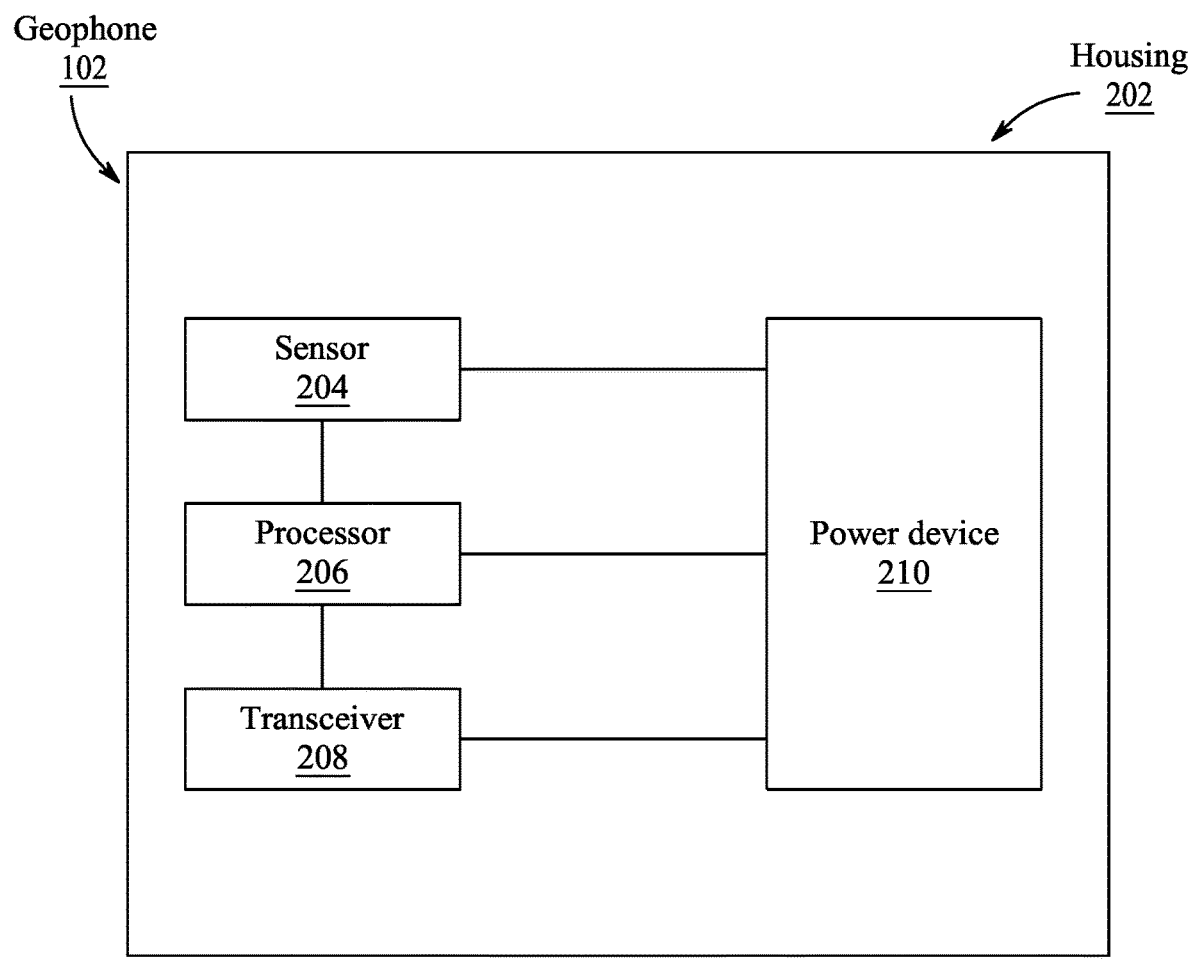
FIG. 2 is a block diagram of a geophone, according to aspects of the present disclosure.

FIG. 2 is block diagram of a geophone 102, according to aspects of the present disclosure. As shown in FIG. 2, the geophone 102 includes a housing 202, a sensor 204, a processor 206, a transceiver 208, and a power device 210.

The housing 202 is configured to enclose the sensor 204, the processor 206, and the transceiver 208. In an aspect, the housing 202 is a weatherproof housing made of plastic, thermoplastic, or metal, such as galvanized steel, aluminum. The housing 202 may be made of any suitable material that is durable, lightweight, and non-conducting.

In an aspect, the housing 202 includes a container portion and a cover portion. The cover portion is adapted for closely fitting the container portion and may be fastened thereto by various types of fastening means, such as screws, or press fitting. In an aspect, the housing 202 may have any one of circular shape, a rectangular shape, an elliptical shape, or variations thereof depending on a desired sensitivity of geophone response. In another aspect, the housing 202 may include openings that may allow a plurality of wirings to pass therethrough. In an aspect, the housing 202 is cylindrical.

The sensor 204 is provided inside the housing 202. The sensor 204 is configured to sense seismic data. The sensor 204 is also configured to receive/detect seismic signals reflected from different layers of the Earth to generate the seismic data. The sensor 204 is configured to detect seismic vibrations in any direction. The sensor 204 is configured to sample and digitize the received seismic signals to generate the seismic digital data. In an example, the sensor 204 is a ground motion sensor that converts ground vibrations into an output voltage. The output voltage represents the deviation in the ground's motion, which forms the seismic data that is subsequently processed in order to study the Earth's subsurface. In an aspect, the sensor 204 may be hydrophones, single or multi-axis motion sensors (e.g., geophones, accelerometers, gyroscopes, inertial sensors), strain sensors, magnetic field sensors, or some combination thereof.

Further, the geophone 102 includes a memory (not shown) for recording the seismic data. The memory is configured to store time-stamped recording of the sensed seismic data. In an embodiment, the memory is configured to store a set of rules for processing the received signals/data. In one embodiment, the memory may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The processor 206 is provided inside the housing 202. The processor 206 is electrically coupled to the sensor 204 and receives the sensor data from the sensor 204. The processor 206 is configured to process the received seismic data and generate a processed seismic data by employing steps of filtering, smoothing, amplification, compression, and so on. In an aspect, the processor 206 is configured to accept commands from the data center 104 for adjusting various parameters associated with the processor 206, such as internal clock timing, sampling frequency, bit resolution of the samples, compression quality, communication format, and such parameters. The processor 206 cooperates with the memory to receive and execute the set of program instructions for processing the received data. The processor 206 may be implemented as one or more microprocessors, microcomputers, digital signal processors, central processing units, state machines, logic circuitries, and/or any devices that manipulate signals based on program instructions.

The transceiver 208 is provided inside the housing 202. The transceiver 208 is electrically coupled to the processor 206 and receives the processed seismic data from the transceiver 208. Further, the transceiver 208 is configured to transmit the processed seismic data and receive the instructions and/or radio frequency (RF) signals from the data center 104. The transceiver 208 may include a wireless-frequency transceiver having a variable gain amplifier that generates radio frequency signals for transmission. A wireless amplifier circuit may be used to amplify the radio frequency signals at the output of the variable gain amplifier for transmission.

The power device 210 is coupled to the sensor 204, the processor 206, and the transceiver 208. The power device 210 is configured to harvest energy from an environment where the geophone 102 is located. The power device 210 is further configured to provide the harvested energy to provide necessary/sufficient power to the sensor 204, the processor 206 and the transceiver 208. In an aspect, the harvested energy may be used to power up the geophone 102 directly and/or charge a battery connected to the geophone 102.

The power device 210 is configured to incorporate several components such as a solar cell, an antenna, a piezoelectric system, an electromagnetic system, an electrostatic system, and a thermoelectric generator for exploiting all means of energy harvesting, i.e., solar, RF, wind, vibration, and thermal energy harvesting. For example, the power device 210 includes the solar cell, the piezoelectric system, and the thermoelectric generator. An example implementation of the power device 210 is explained in detail in FIG. 3.

In an aspect, the power can be used in a controlled manner to achieve extended battery life without affecting the working of the geophone 102. For example, each unit of the geophone 102 may be configured to function at a predetermined time. In an aspect, the geophone includes a power storage unit for storing the energy harvested by the power device 210. The power storage unit is coupled between the sensor 204, the processor 206, the transceiver 208 and the power device 210, and the power storage unit is configured to provide sufficient power to all the units/modules/components of the geophone. In an embodiment, the power storage unit includes a primary battery and a second battery. In some embodiments, the primary battery may be a rechargeable battery. In another embodiment, the second battery is selected from a group including a lead acid battery, a lithium-ion battery, and a nickel-metal-hydride battery.

Figure 3:
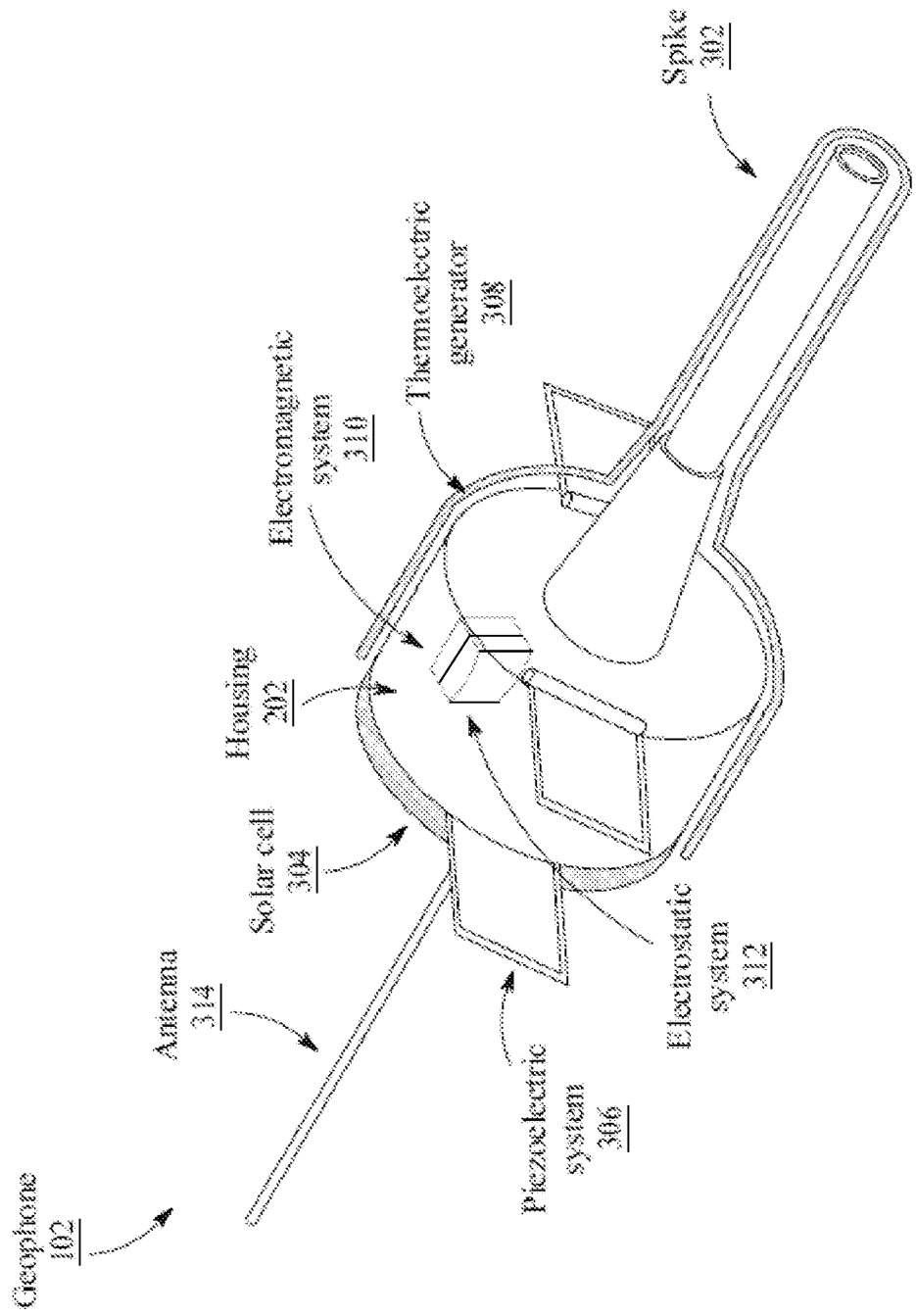
FIG. 3 is an exemplary illustration of the geophone, according to aspects of the present disclosure.

FIG. 3 is a schematic view of the geophone 102, according to exemplary aspects of the present disclosure. As shown in FIG. 3, the geophone 102 includes a housing 202, a spike 302, a solar cell 304, a piezoelectric system 306, a thermoelectric generator 308, an electromagnetic system 310, an electrostatic system 312, and an antenna 314.

The construction of the housing 202 is substantially similar to that of the housing of FIG. 2, and thus the construction is not repeated here in detail for the sake of brevity. The spike 302 is provided on a bottom surface of the housing 202. In an aspect, the spike 302 is a conical spike, optionally including an extending rod portion that represents the major portion of the length of the spike. The geophone 102 is embedded, via the spike 302, a few inches underground to ensure good coupling to the motion of the Earth. In another embodiment the spike is retractable or removable thus permitting the bottom portion of the housing to contact the earth. In a preferable embodiment (not shown in FIG. 3) the entire housing is cone shaped with an a continuous asymptotic outer surface extending from the bottom to the top of the geophone housing.

The solar cell 304 is provided on a top surface of the housing 202. The solar cell (photovoltaic cell) 304 converts light energy into electrical energy by the photovoltaic effect (also known as solar harvesting). In an aspect, the solar cell 304 may be placed around the geophone body. The surface area of geophones exposed to sunlight might be small; however, the high energy density of the solar cells 304 means a sizeable amount of energy is harvested for the successful realization of the wireless geophone 102. In an aspect, the solar cell 304 includes a copper-backed solar panel. In an aspect, the solar cell 304 is further provided on a lateral surface of the housing 202.

The geophone 102 may harvest vast amount of vibration energy that is generated by the vibroseis trucks. These trucks generate vibration energy at regular intervals and thus provide a reliable source of energy to the geophone 102. The geophone 102 is configured to employ various kinds of vibration energy harvesters to utilize the vibration energy up to the maximum extent. For example, the vibration energy harvester may include a piezoelectric-based vibration energy harvester, an electromagnetic-based vibration energy harvester, and an electrostatic-based vibration energy harvester.

In an aspect, the piezoelectric system 306 is provided on an edge of the housing 202 adjacent to the top surface. The piezoelectric system 306 is configured to measure the changes in various parameters, including acceleration, strain, wind force, and other weather conditions. The piezoelectric system 306 is configured to employ vibration energy harvesting and transform the vibration energy into electrical energy through various mechanisms, e.g., electromagnetic induction, electrostatic mechanism, or piezoelectric approach. In an aspect, the piezoelectric system 306 has a resonant frequency that is tunable.

In vibration energy harvesting, ambient vibration around the piezoelectric system 306 (piezoelectric energy harvester) induces mechanical strain. Usually, a cantilever-type piezoelectric energy harvester includes a proof mass located at a free end of a beam. The electrical energy is generated from bending vibrations under excitation at the root of the beam. Among the various structures of piezoelectric energy harvesters, a piezoelectric transducer is widely known for with nonlinear characteristics. In an aspect, a number of permanent magnets are often attached to the accompanying structures of the piezoelectric energy harvester for reproducing the effect of external vibration forces. The resonant frequency of the piezoelectric energy harvester is influenced by the geometric nonlinearity (in the presence or absence of the external magnets) and the distance between the magnets. Further, a hybrid vibration energy harvester (consisting of electromagnetic and piezoelectric generators) with nonlinear magnetic forces may effectively boost output performance under random excitation. In an aspect, the piezoelectric system 306 employs the piezoelectric transducer due to the simple structure of the piezoelectric transducer, its compact size, and power generation efficiency. As piezo patch size is very thin, and the hybrid vibration energy harvester is simpler and smaller than other existing piezoelectric energy harvesters. In an aspect, the piezoelectric transducer is fabricated using aluminum nitride, lead zirconate titanate (PZT), quartz, berlinite, and zinc nanowires (ZnO).

The electromagnetic system 310 (electromagnetic-based energy harvester) is configured to produce electrical energy from the mechanical energy obtained by relative motion between a coil and a conductive magnetized body. The electromagnetic system 310 includes a pick-up coil, a magnet, a mechanical barrier arm, and a cantilever beam. The electromagnetic system 310 is used for low-frequency range applications, i.e., 1-10 Hz. The performance of the electromagnetic system 310 may be improved by adjusting an external excitation frequency.

An effective harvesting bandwidth of the electromagnetic system 310 may be increased by using an excitation structure having a multi-degree of freedom system. Another way of making bandwidth wider is to introduce nonlinearity in the electromagnetic system 310. Coupling between tuning modes, hybrid transduction, and multi-modal arrays are several strategies used to improve efficiency through the incorporation of nonlinearity into the electromagnetic system 310. In an aspect, the electromagnetic system 310 is designed to improve the operating frequency range by using a dual resonator technique having two separate resonator systems. Due to the multi-vibration mode, multiple frequencies of various modes are tuned to a specific spectrum, resulting in a wider bandwidth.

The electromagnetic system 310 generates a good amount of electrical energy from weak vibration. Since generated electrical energy is proportional to the operating frequency, the frequency-up conversion may be used in order to obtain the desired amount of average energy. In an aspect, the electromagnetic system 310 has a resonant frequency that is tunable. The electromagnetic system 310 occupies a comparatively larger space in the geophone 102 and suffers from magnetic deterioration and windage loss. In an aspect, the electromagnetic system 310 is used to produce, for example, 30.313 mW of power.

The electrostatic system 312 (an electrostatic energy harvester) is configured to produce charges by relative motion between two charged capacitor plates, resulting in a potential difference in the capacitor and thus static electricity. By opting for a freestanding triboelectric setup, the efficiency of the electrostatic system 312 may be enhanced. In the freestanding triboelectric setup, one dielectric material is free while another pair of dielectric materials is fixed and attached to electrodes. Lateral sliding occurs between free and paired electrodes. Further, by performing hybridizing triboelectric materials with electromagnetic and piezoelectric materials, optimum power output may be achieved. In an aspect, the electrostatic system 312 may generate sufficient electrical energy that may be provided to LED bulbs and supercapacitors. In an aspect, the electrostatic system 312 requires an external voltage source. The electrostatic system 312 is configured to produce a high voltage due to its high internal impedance as compared to other energy harvesters. In an embodiment, the range of power generated by the electrostatic system 312 is 0.12-37.7 microWatt. Further, due to the absence of smart materials like optoelectronics, piezo patches, shape memory alloy, and magnetostrictive, the triboelectric energy harvester is long-lasting with an adjustable coupling coefficient and low system cost.

In an aspect, the electromagnetic system 310 and the electrostatic system 312 are provided inside the housing 202.

A thermoelectric generator 308 may be provided on the bottom surface of the housing 202 and/or the surface of the spike 302. The thermoelectric generator 308 is configured to convert a thermal (temperature) gradient into electrical energy by utilizing the Seebeck effect. The thermoelectric generator 308 harvests the electrical energy from the thermal gradient that exists between the part of the geophone 102 that is inserted inside the ground and the part that is exposed to the open environment in the seismic field. In an aspect, the thermoelectric generator 308 is a reliable conversion of thermal energy to electrical energy with no moving parts.

In an example, thermoelectric generator 308 is a pyroelectric generator or a thermoelectric generator. The pyroelectric generator converts the temperature fluctuations in the material into usable electrical energy. The thermoelectric generator 308 does not require temperature fluctuations; rather, it relies on temperature differences. The thermoelectric generator 308 offers unique characteristics, such as a small footprint, lightweight, solid-state with no moving parts, free from noise, resistant to mechanical damage, which means less maintenance, and long-term use in harsh environments.

The thermoelectric generator 308 requires a temperature gradient of around 5-10° K to generate electrical power in the milliwatt range. In the present geophone 102, the thermoelectric generator 308 is placed on the outer surface of the geophone installed in the seismic field. In an aspect, the thermoelectric generator 308 may also be configured to generate power using a ground-to-air temperature gradient.

In an aspect, the geophone 102 may include a small-scale wind energy harvester. The wind energy harvester may work on a rotary movement of windmills/wind turbines and an aeroelastic behavior of materials.

Most windmills and wind turbines work on the principle of electromagnetic induction to generate electrical energy. However, the rotary movement may be converted to electrical energy using other induction mechanisms as well. The windmills and wind turbines are used to convert the kinetic energy of wind into mechanical energy. The mechanical energy can then be converted to electrical energy using any of the three induction mechanisms (piezoelectric, electromagnetic, or electrostatic). It can be observed that all of these designs are of large dimensions (several cms), and their power density is extremely low to be useful for geophones. Actually, the efficiency of all harvesters based on rotary motion is reduced drastically at lower wind speeds. This indicates clearly that high wind speeds are needed to take advantage of the windmills and wind turbines. However, high wind speeds are not always available. Therefore, operating small-scale devices such as geophones and other sensors using the wind turbines is not a viable solution.

On the other hand, the wind energy harvester utilizing the aeroelastic behavior of materials is mainly based on piezoelectric induction. Aeroelasticity refers to the tendency of an elastic body to vibrate when it is exposed to a fluid flow (flow of wind/air for disclosure). These vibrations may be induced due to various aerodynamic phenomena such as flutter, vortex-induced vibrations, galloping, and buffeting. These phenomena are undesirable in most applications, such as aircraft wings, bridges, transmission lines, etc. However, these phenomena can be used to generate power.

The wind energy harvester is exposed to a flow field which results in large limit-cycle oscillations. The kinetic energy of these oscillations may then be converted to electrical energy. In an aspect, the present geophone is configured to employ at least one a Vortex-induced vibration (VIV) wind energy harvester, a galloping energy harvester, a wake Galloping energy harvester, a Flutter-based energy harvester, and a Turbulence-induced vibration (TIV) wind energy harvester.

In an aspect, the geophone 102 includes a photocell (not shown) that is provided on the top surface of the housing 202.

In an aspect, the geophone 102 includes an antenna 314, coupled to the transceiver 208, for transmitting and receiving RF signals. The antenna 314 is provided on the top surface of the housing 202. In an aspect, a rectifier is coupled to the antenna 314. The rectifier is configured to convert the received RF signals into direct current (DC) signal (s). Further, a matching circuit is coupled between the antenna 314 and the rectifier. The matching circuit is configured to match an impedance of the antenna 314 to the rectifier. In an aspect, the matching circuit includes a shunt inductor. In another aspect, the matching circuit includes an LC circuit. In an aspect, the matching circuit includes a transformer.

Figure 4:
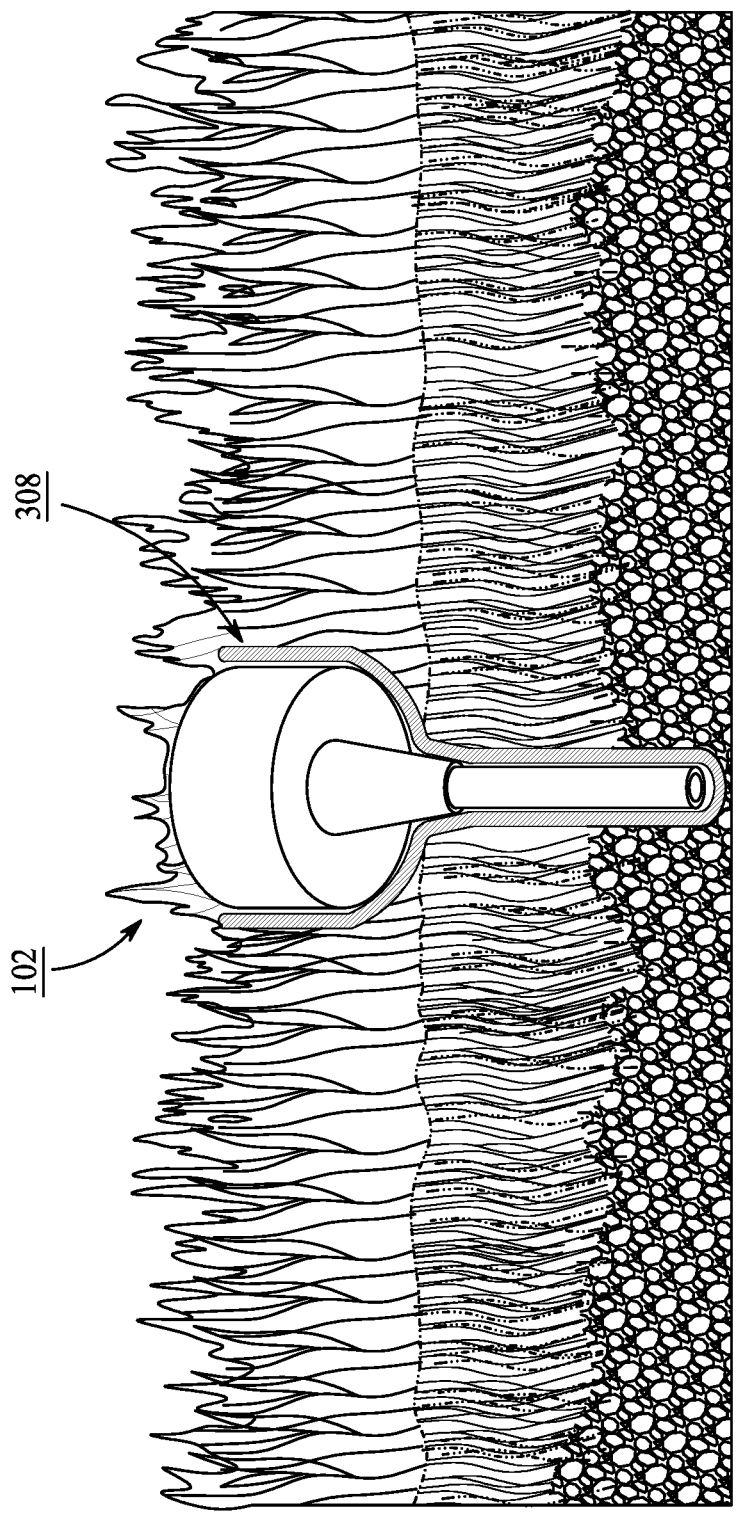
FIG. 4 is a perspective view of the geophone with a thermoelectric generator, according to aspects of the present disclosure.

FIG. 4 is a perspective view of the geophone 102 with the thermoelectric generator 308. As shown in FIG. 4, a part of the geophone 102 is under the ground and the remaining part is kept above the surface. This creates a temperature gradient due to the temperature difference between the ground and the surface. Usually, a significant temperature difference exists between the upper surface of the seismic field and a few centimeters below it. The thermoelectric generator 308 converts the temperature gradient into electrical energy. The electrical energy harvested from the thermoelectric generator 308 may be utilized to provide power to geophones 102 installed in seismic fields. In an aspect, the thermoelectric generator 308 is further provided on a lateral surface of the housing 202. In another aspect, the thermoelectric generator 308 is provided on a portion of the lateral surface of the housing 202. In yet another aspect, the thermoelectric generator 308 is provided on the entire lateral surface of the housing 202.

Figure 5:
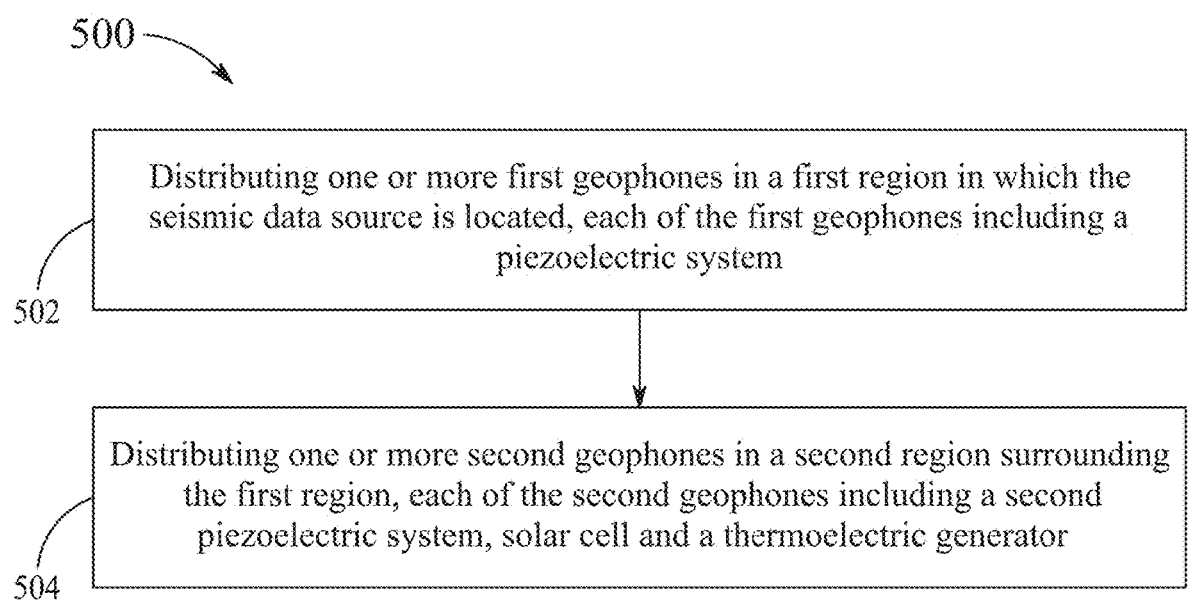
FIG. 5 is a flowchart for distributing geophones around a seismic data source, according to aspects of the present disclosure.

FIG. 5 is a flowchart 500 for distributing geophones around a seismic data source, according to aspects of the present disclosure.

Step 502 includes distributing one or more first geophones in a first region in which the seismic data source 104 is located. Each of the first geophones includes a piezoelectric system 306. In an aspect, the first geophones are placed near the seismic data source 104, such that the piezoelectric system 306 utilizes the maximum vibrations generated by the seismic data source 104 for harvesting energy. A hybrid vibration energy harvester is designed for the geophone 102.

The surface area and the internal space in the geophone 102 allow a manufacturer to use the piezoelectric system 306, the electromagnetic system 310, and the electrostatic system 312 altogether. However, the geophones 102 that are close to the vibroseis truck get the maximum vibration as compared to the ones that are far away. Hence, nearby geophones benefit more from the vibration energy harvesters for a particular shot. It is also worth mentioning that the vibroseis truck moves within the seismic field, and shots are carried out at various locations to cover all the seismic area. In an aspect, each geophone gets approximately the same amount of vibration energy per day. For example, the vibroseis trucks inject a sweep (around 8 to 10 sec duration) of low frequencies into the Earth, typically in the range of 1-100 Hz, and therefore, it is critical to tune the resonant frequency of a vibration energy harvester accordingly. A slight deviation may drastically reduce the amount of energy being harvested.

Since the range of vibration frequency is known in the seismic survey, the energy harvester may be designed with high efficiency. The power generation performance of the vibration energy harvester is confined to the resonance excitation. In numerous applications, ambient vibration is often broadband and random, and this type of excitation must be considered when designing a vibration energy harvester. In other words, the operating frequency and bandwidth of the harvester are usually confined to a specific range that cannot cover the random vibration frequencies of external sources.

Step 504 includes distributing one or more second geophones in a second region surrounding the first region. In an aspect of the present disclosure, each of the second geophones includes at least one of a solar cell and a thermoelectric generator. In an aspect, the second geophones are placed far from the seismic data source 104. By placing the second geophones in the second region, the solar cell 304 and thermoelectric generator 308 may be safeguarded by the high amplitude vibrations generated by the seismic data source 104.

In an aspect, the method further includes a step of distributing in the first region one or more third geophones, each including an electrostatic/electromagnetic system.

In an aspect, the method includes further includes a step of distributing in the second region one or more fourth geophones, each including an antenna.

EXAMPLES AND EXPERIMENTS

The following examples are provided to illustrate further and to facilitate the understanding of the present disclosure.

Experimental Data and Analysis

First Experiment: Energy Requirement of a Geophone

The first experiment is carried out for determining the power requirement of the geophone 102. The geophone 102 is equipped with sensing (recording), processing, and communicating abilities. Therefore, the geophone 102 includes a sensing unit, a processing unit, a communication unit, and a power unit. The power consumed by sensing and processing units is used for data collection and data processing. The geophone 102 requires an adequate amount of power to operate. For example, the existing geophone requires 115 Wh battery for continuous recording for 30 days (24 hours per day). Here the power consumption is around 159 mW for sensing and processing. For computing the power consumed by the communication unit, the following approach is adopted.

The transmitted signal from the geophones 102 experience certain path-loss. Since geophones are deployed in an open-field or rural environment, the path-loss (in dB) can be modeled as follows:

$$PL(d) = \begin{cases} PL_1(d), & 10m < d < d_{BP} \\ PL_2(d), & d_{BP} < d < 10km \end{cases} \quad (1)$$

where $$d_{BP} = \frac{2\pi h_{BS} h_u f_c}{c}$$

is me breakpoint distance, d is the ground distance between the geophone and the base station (BS), either gateway or data center, $h_{BS}$ is the base station (BS) antenna height, $h_u$ is the height of the geophone antenna above the ground, $f_c$ is the carrier frequency, and c is the speed of light, $$PL_1(d) = 20\log_{10}\left(\frac{4\pi d_{3D} f_C}{c}\right); \quad (2)$$

$$PL_2(d) = PL_1(d_{BP}) + 40\log_{10}\left(\frac{d_{3D}}{d_{BP}}\right); \quad (3)$$

and $d_{3D} = \sqrt{d^2 + (h_{BS} - h_u)^2}$ is the 3D distance between the geophone and the BS.

Considering the above path-loss and certain transmit power $P_t$ at the geophone, the received power $P_r$ at the BS is given by:

$$P_r(\text{in dBm}) = P_t(\text{in dBm}) - PL(d). \quad (4)$$

Considering typical values of carrier frequency $f_c = 1$ GHz, BS antenna height $h_{BS} = 10$ m and geophone antenna height $h_u = 1$ m, the BS received power $P_r$ as a function of distance d for different values of the geophone transmit power $P_t$. As expected, the received power decreases with the increase in the distance d due to the increase in the path-loss. Considering typical noise power density of −174 dBm/Hz, the noise power $\sigma^2$ is given by:

$$\sigma^2(\text{in dBm}) = -174 + 10 \log_{10}(B), \quad (5)$$

where B is the transmission bandwidth (BW).

The above analysis may assist in calculating the signal-to-noise-ratio (SNR) at the BS for decoding the wireless geophone signal, which is given by:

$$SNR = P_r(\text{in dBm}) - \sigma^2(\text{in dBm}) \quad (6)$$

If it is considered that the transmit power, $P_t = 0$ dBm (1 mW) and the ground distance of 1 km, the received power at the BS is −106 dBm. This will lead to the received SNR of 28 dB under the transmission BW of 10 KHz (enough for achieving the data rate of 12 kbps). This SNR is adequate to decode the signal with a low bit-error rate. This implies that even assuming the quite far distance of 1 km, an acceptable SNR of 28 dB to decode the received signal at the BS can be achieved.

If received SNR at the BS against different possible values of transmit power $P_t$ is considered, then at an extreme distance of 1 km, the transmit power should be at least 0 dBm to ensure SNR of 28 dB under transmission BW of 10 kHz. The typical value of $P_t = 0$ dBm, which is equal to 1 mW, is enough to ensure adequate SNR with sufficient coverage.

Second Experiment: Energy Harvesting for the Geophone

The second experiment was carried out to determine how to harvest sufficient energy from different means that can allow continuous sensing and processing (power consumption of around 159 mW), and communication (transmit power requirement of around 1 mW from the geophone to cover up to 1 km distance).

Solar Energy Harvesting

The presence of a significant amount of sunlight in outdoor environments makes it a useful energy source for geophones. A solar cell, or a photovoltaic cell, converts light energy into electrical energy by the photovoltaic effect when mounted on the geophone.

The solar cell 304, employed with the geophone 102, should be resilient/robust against rugged environments. Most often, the geophone 102 is exposed to extreme conditions such as high temperatures, moisture, rain, sandstorms, snow, hail, wind, etc., which may result in corrosion, significant efficiency loss, and in some cases breakdown of the solar cells. Therefore, for solar harvesting in the geophone 102, different characteristics of the solar cells 304 and the solar cell efficiency may be considered. In an aspect, preferable characteristics of the solar cell 304 are provided below.

Power Tolerance: A power tolerance metric indicates the variation in the power output that could happen due to some unavoidable circumstances. These variations are measured as a percentage of the solar cell's power rating. A negative power tolerance means that the actual power output will always be equal to or greater than the specified output. A solar cell that has a non-zero negative tolerance will result in reduced power output as compared to its rating and, therefore, may not be a good choice.

Temperature Coefficient: Solar cells 304 rely solely on the light from the Sun, which is also a source of heat. Solar cells are also sensitive to high temperatures. The output of solar cells 304 may reduce significantly at high temperatures. A temperature coefficient indicates the rate at which the efficiency of solar panels drops for every 1° C. above 25° C. The temperature of 25° C. is used as a reference point as all solar panel characteristics.

Durability: The solar cell 304 is required to withstand extreme conditions such as snow, hail, and wind.

While performing the experiments, it is evident that the solar cells based on Maxeon technology (manufactured by SunPower, located at Suite 207, 28 Riddell Parade Elsternwick VIC 3185 Australia) performed very well over conventional solar cells due to structural differences. Conventional cells use busbars that run through the face of the cell to capture electrical energy created by the cell. However, solar cells based on Maxeon technology are backed with solid copper to capture the electrical energy. This allows more surface area for the solar cell to capture energy which results in higher efficiency. Moreover, the use of copper at the back of the solar cell 304 makes it resilient to corrosion and daily wear and tear from thermal expansion, etc. In light of the detailed experimentation, it is concluded that the solar cells based on Maxeon technology are highly efficient and at the same time robust to the harmful effects of the environment.

The solar energy harvesting infrastructure is low cost, and noise-free. Sunlight is available to every geophone, and, therefore, solar energy can be harvested by any geophone. Despite these advantages, there are some limitations. For example, sunlight is not available at night. Similarly, different weather conditions may result in the limited availability of energy. Furthermore, since geophones are placed on the ground, there is a risk that solar panels will be covered by dust, hence lowering the efficiency. Therefore, a reliable green system must not rely solely on solar energy. This implies that any reliable green solution must be hybrid, i.e., it is designed to harness different forms of energy that are available throughout the year.

As a case study, the viability of energy harvesting by solar energy in one of the major city (Dammam) in the Eastern region of Saudi Arabia was conducted. Note that Saudi Arabia is chosen for the feasibility study of solar-powered wireless geophones as it is currently the largest oil producer and thus the largest consumer of geophones. The amount of harvested energy depends on the availability of the sunlight and the sky condition (whether it is clear or covered by the clouds). In this regard, the average number of sun hours per month and the average cloud coverage (in percentage) during different months in Dammam, Saudi Arabia is recorded. It is observed that Sun is easily available for around 12 hours per day and the cloud coverage is also in an acceptable range. Particularly, the cloud coverage is around 10% or even less during summer (June-October), which shows that solar energy harvesting is very much suitable during summer days. However, the weather is hot for most part of the year, and the temperature can reach up to 50° C.

in Summer, which reduces the output of solar panels. It is, therefore, concluded that the presence of sunlight across the world and the availability of high energy density solar cells make it feasible to equip geophones with solar cells. The surface area of geophones exposed to sunlight might be small; however, the high energy density of the cells means a sizeable amount of energy could be harvested for the successful realization of wireless geophones.

Vibration Energy Harvesting

For the geophone 102, a hybrid vibration energy harvester may be used to harvest energy from each type of harvesting. The surface area and the internal space in the geophone allow using piezoelectric, electromagnetic, and electrostatic energy harvesters altogether. Various commercial piezoelectric harvesters are available in the market to be suitable for the geophones. During the experimentation, it was concluded that PPA-2011, PPA-2014, and PPA-4011 are well suited for the present geophone 102. Furthermore, multiple piezo may be connected together for more power.

Wind Energy Harvesting

During the experimentation, it was found that most of the wind energy harvesting methods do not perform efficiently at low wind speeds. Thus, such techniques are not suitable for regions with low average wind speeds. As an example, the wind speed data of Dammam city in Saudi Arabia is gathered from a website of local weather forecast, news, and conditions. The maximum wind speeds in Dammam city are as high as 15 m/s, the average speed every day is around 4 m/s. With this data, it is obvious that for a wind energy harvesting system to be effective for Dammam city, the cut-in wind speed must be less than 4 m/s. Moreover, as the amount of energy generated by green energy harvesting solutions is not sufficient for the sustainable operation of the geophone, it is important to devise a hybrid system. Therefore, wind energy harvesting could be used along with other energy harvesting methods to provide a sustainable solution.

Thermal Energy Harvesting

Another solution to power geophones is through energy harvesting from the thermal gradient that exists between the part of a geophone inserted inside the ground and the part that is exposed to the open environment in the seismic field. The thermoelectric generators offer unique characteristics, such as: small footprint, lightweight, solid-state with no moving parts, free from noise, resistance to mechanical damage which means less maintenance, and long-term use in harsh environments. A harvesting power in the range of hundreds of milliwatts is possible using thermal sources and could be potentially used for various applications.

Harvesting Energy from RF

Harvesting energy from RF sources, also known as wireless energy harvesting. The geophones may also take advantage of this technology. Specifically, the presence of an on-site data center 104 provides an opportunity to power wireless RF Energy Sources. In general, a wireless geophone can harvest RF energy from various different sources. Any device emitting radio waves can be considered as a source for wireless energy harvesting. The frequency range of such sources depends on the type of transmitter. The most common radio sources are radio/TV broadcasting stations, satellites, wireless fidelity (Wi-Fi), global system for mobile communications (GSM), universal mobile telecommunications system (UMTS), and long term evolution (LTE) base stations. These sources cover a broad range of frequencies, starting from 3 kHz to 300 GHz of the electromagnetic spectrum. These RF energy sources are ubiquitous and are even available in the most inaccessible places.

A typical RF energy harvesting system includes an antenna that receives the incident power, a matching network for maximizing the power transfer and minimizing the signal reflection, and an RF to DC rectifier. RF energy harvesting can also be used along with data transfer in a communication system. The power densities of RF sources vary from 0:45 $nW/cm^2$ for GSM900 mobile terminal to 84 $nW/cm^2$ for GSM1800 base station.

Optimal Signal Design for RF Energy Harvesting

The signal waveform design also plays an important role in efficient RF energy harvesting. Various waveform designs based on single or multiple antenna transmissions are reported in the literature. It has been shown that the design of an appropriate signal generation method that adapts as a function of the channel condition, significantly boosts the amount of harvested energy. Particularly, the transmitted RF signal has been proposed to be the superposition of multiple sine-waves of unique amplitudes and phases, where the number of sine-waves depends upon the number of channel subbands.

In an aspect, a signal waveform design plays an important role in efficient RF energy harvesting. There are many different waveform designs available based on single or multiple antenna transmissions. It has been shown that the design of an appropriate signal generation method that adapts as a function of the channel condition, significantly boosts the amount of harvested energy. In particular, the transmitted RF signal has been proposed to be the superposition of multiple sine-waves of unique amplitudes and phases, where the number of sine-waves depends upon the number of channel subbands.

Consider a general multiple-antenna transmitter with M transmit antennas and assume N channel subbands for a general frequency-selective channel. The transmit vector signal can be expressed as:

$$x(t) = \Re\left\{\sum_{n=0}^{N-1} w_n e^{j2\pi f_n t}\right\} \tag{7}$$

where $x(t)=[x_1(t), \ldots, x_M(t)]^T$ is a vector of transmitted signal from M antennas, $w_n=[w_{n,1}(t), \ldots, w_{n,M}(t)]^T$ with $w_{n,m}(t)=s_{n,m}(t)e^{j\Phi_{n,m}(t)}$ expresses the amplitude and phase of the subband signal on frequency $f_n$ and transmit antenna m at time t. If the frequency response of the multipath channel is given by $h_{n,m}=A_{n,m}e^{j\Psi_{n,m}}$, the optimal design of $w_n$ is given by $$w_n = \frac{h_n^H}{\|h_n\|}\|h_n\|^\beta \sqrt{\frac{2P}{\sum_{n=0}^{N-1}\|h_n\|^{2\beta}}} \tag{8}$$

where $h_n=[h_{n,1}, \ldots, h_{n,M}]$, and $\beta$ is a scaling factor whose optimal value is chosen to be 3 and P is the transmit power budget. Under a single-antenna transmitter, the optimal design can be expressed as $$w_n = A_n^\beta \sqrt{\frac{2P}{\sum_{n=0}^{N-1} A_n^2}} e^{-j\psi_n} \tag{9}$$

The present disclosure envisages a scheme for seismic data transmission utilizing wireless network based on IEEE802.11af standard. Usually, the ambient energy from this RF source (data center 104) is not sufficient for powering the geophones and, therefore, other sources need to be added to the system. Nevertheless, the RF energy harvesting may be utilized with other energy harvesting schemes in a hybrid manner. In an aspect, an unmanned aerial vehicle (UAV) may be employed/used to power up the geophones through RF signals.

In similar way, if the geophones 102 are located far away from the data center 104 and unable to receive RF signals in an effective way and also fail to transmit the recorded data to data center(s) 104 directly, then in such scenario's UAVs may be used for collecting the recorded data from the geophones 102. Thus, the UAVs may be used to simultaneously receive data from and transmit RF signals (power) to the geophones 102.

The downlink channel can be leveraged to intelligently design waveforms that are friendly for RF energy harvesting operations. Thus, the amount of energy being harvested can be improved for the geophones. Another interesting design strategy could be to use these special waveforms that can maximize the RF energy harvesting efficiency as acknowledgments (positive or negative) for a geophone. Finally, the waveform design including multiple antennas at the data center and a single antenna at a geophone may also be opted. This is perfect for a typical wireless seismic acquisition setup since it relieves a limited-power geophone while shifting heavy processing to the data center where power requirements are relaxed. The wireless geophones may also take advantage of the presence of an on-site data center that provides an opportunity to power wireless geophones through RF energy. Power is readily available at the data centers 104 and can be used to transmit energy to geophones 102 using a wireless link.

The first embodiment is illustrated with respect to FIGS. 1-5. The first embodiment describes a geophone 102. The geophone 102 includes a housing 202; a spike 302 provided on a bottom surface of the housing 202; a sensor 204 provided inside the housing 202, the sensor 204 configured to sense seismic data; a processor 206 provided inside the housing 202 and coupled to the sensor 204, the processor 206 configured to process the seismic data; a transceiver 208 provided inside the housing 202 and coupled to the processor 206, the transceiver 208 configured to transmit the processed seismic data and receive radio frequency (RF) signals wirelessly; and a power device 210 coupled to the sensor 204, the processor 206 and the transceiver 208. The power device 210 is configured to harvest energy from an environment where the geophone 102 is located and is further configured to power the sensor 204, the processor 206 and the transceiver 208. The power device 210 includes a solar cell 304 provided on a top surface of the housing 202; a piezoelectric system 306 provided on an edge of the housing 202 adjacent to the top surface; and a thermoelectric generator 308 provided on the bottom surface of the housing 202 and a surface of the spike 302.

In an aspect, the power device 210 further includes an antenna 314 provided on the top surface of the housing 202 and coupled to the transceiver 208, the antenna 314 configured to receive the RF signals.

In an aspect, the geophone 102 further includes a rectifier coupled to the antenna 314, and a matching circuit coupled between the antenna 314 and the rectifier. The rectifier is configured to convert the RF signals into direct current (DC) signals. The matching circuit is configured to match an impedance of the antenna 314 to the rectifier.

In an aspect, the matching circuit includes a shunt inductor.

In an aspect, the matching circuit includes an LC circuit.

In an aspect, the matching circuit includes a transformer.

In an aspect, the power device 210 further includes an electrostatic/electromagnetic system 312/310 provided inside the housing 202.

In an aspect, the electrostatic/electromagnetic system 312/310 has a resonant frequency that is tunable.

In an aspect, the solar cell 304 includes a copper-backed solar panel.

In an aspect, the solar cell 304 is further provided on a lateral surface of the housing 202.

In an aspect, the piezoelectric system 306 has a resonant frequency that is tunable.

In an aspect, the thermoelectric generator 308 is further provided on a lateral surface of the housing 202.

In an aspect, the thermoelectric generator 308 is provided on a portion of the lateral surface of the housing 202.

In an aspect, the thermoelectric generator 308 is provided on the entire lateral surface of the housing 202.

In an aspect, the housing 202 is cylindrical.

In an aspect, the geophone 102 further includes a photocell provided on the top surface of the housing 202.

In an aspect, a power storage unit is coupled between the sensor 204, the processor 206, the transceiver 208 and the power device 210, the power storage unit configured to store the energy harvested by the power device 210.

In one aspect, the disclosed design of a multi-source energy harvesting geophone can be easily modified to create a multi-source energy harvesting based green wireless sensor network, thereby extending the operating life of various IoT-based sensor networks in fields such as agriculture, smart cities, smart buildings, transportation systems, healthcare, and manufacturing.

The second embodiment is illustrated with respect to FIGS. 1-5. The second embodiment describes a method for distributing geophones 102 around a seismic data source 104. The method includes distributing one or more first geophones in a first region in which the seismic data source is located, each of the first geophones including a piezoelectric system; and distributing one or more second geophones in a second region surrounding the first region, each of the second geophones including at least one of a solar cell, and a thermoelectric generator.

The method further includes distributing in the first region one or more third geophones each including an electrostatic/electromagnetic system.

The method further includes distributing in the second region one or more fourth geophones each including an antenna.

Figure 6:
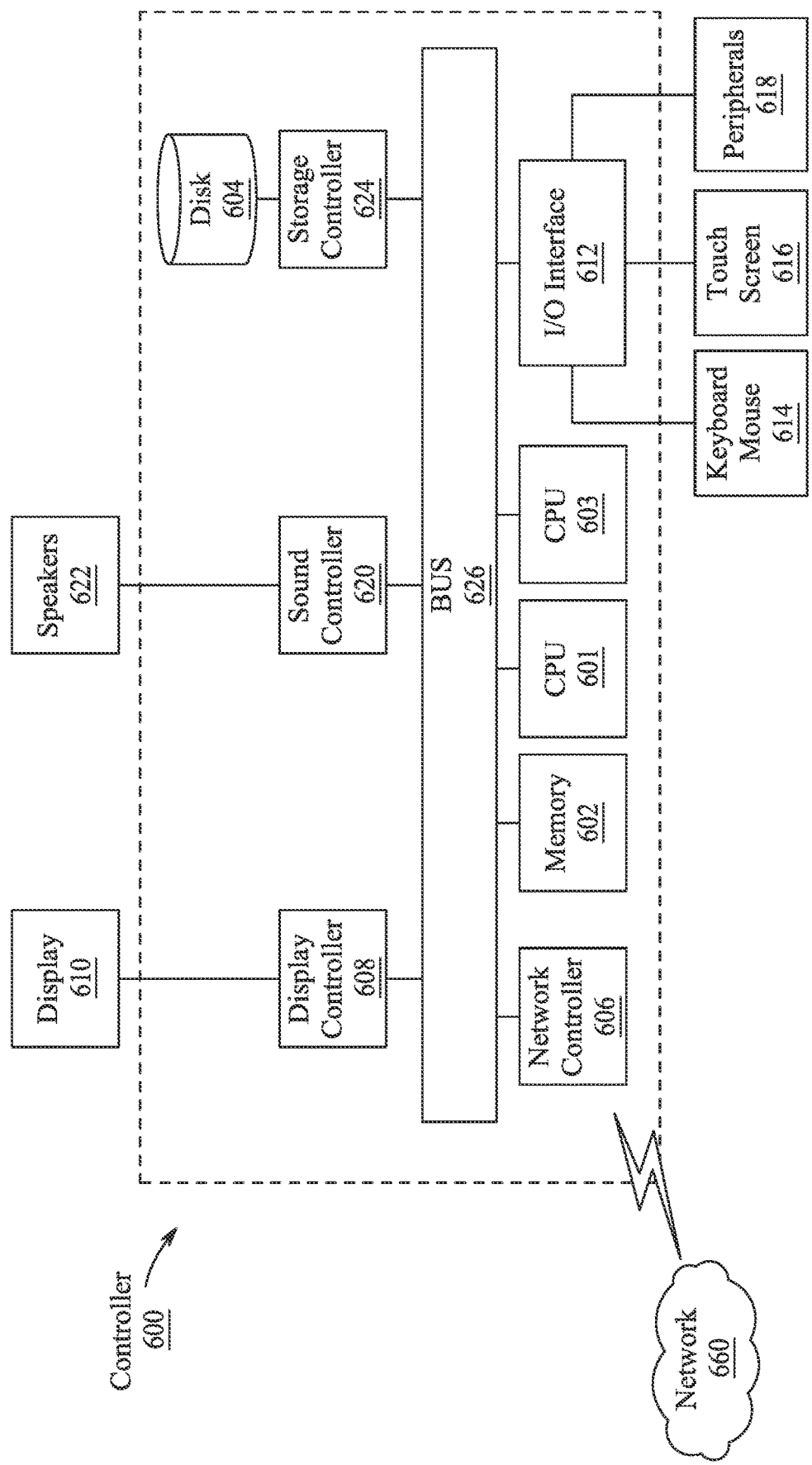
FIG. 6 is an illustration of a non-limiting example of details of computing hardware used in the computing system, according to aspects of the present disclosure.

Next, further details of the hardware description of the computing environment of FIG. 1 according to exemplary embodiments is described with reference to FIG. 6. In FIG. 6, a processing circuitry 600 is described as representative of the processor 206 of FIG. 2 in which the processor 206 is a computing device which includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skilled in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks. The network 660 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
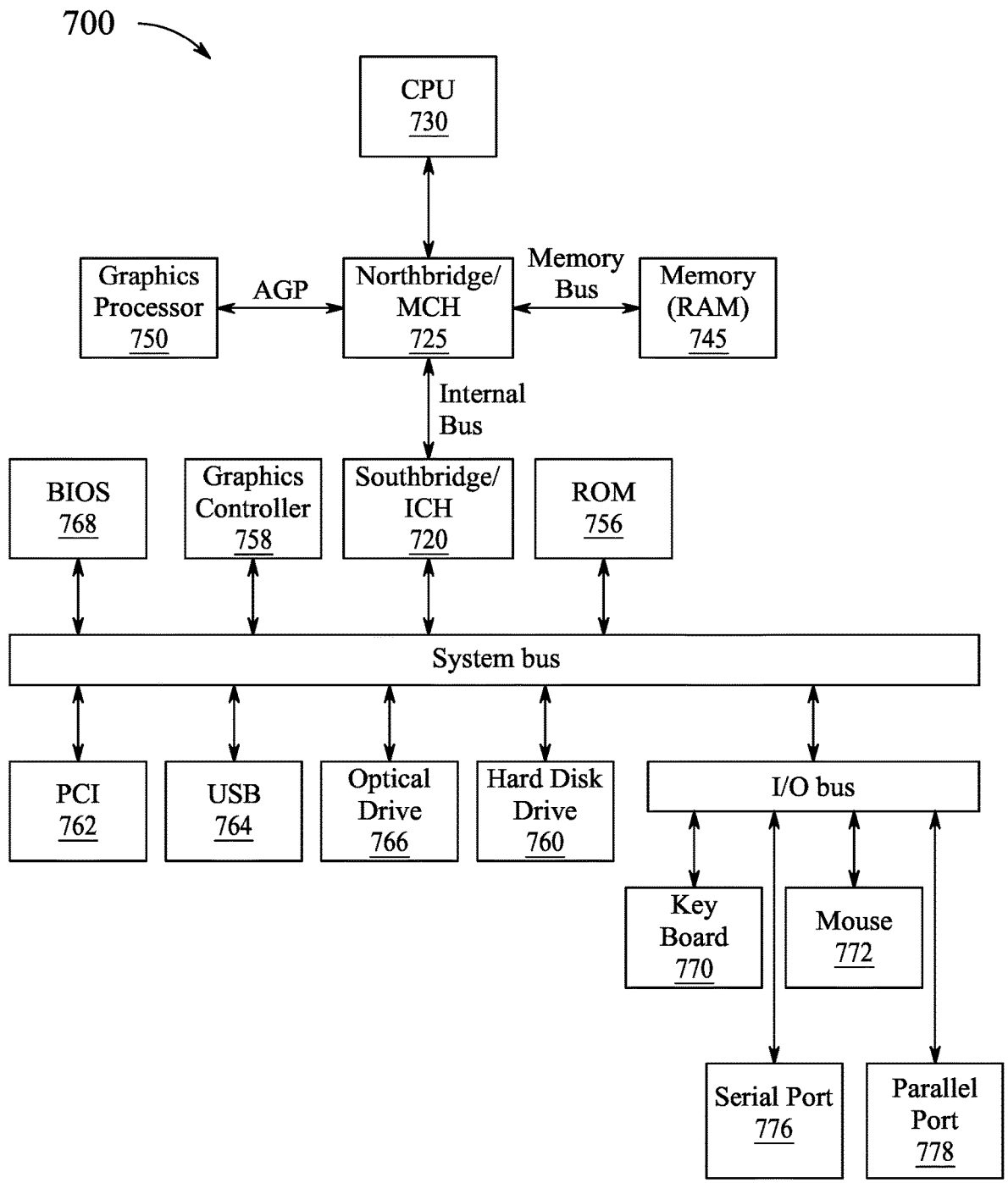
FIG. 7 is an exemplary schematic diagram of a data processing system used within the computing system, according to aspects of the present disclosure.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The Central Processing unit 730 may contain one or more processors and even may be implemented using one or more heterogeneous processor systems.

Figure 8:
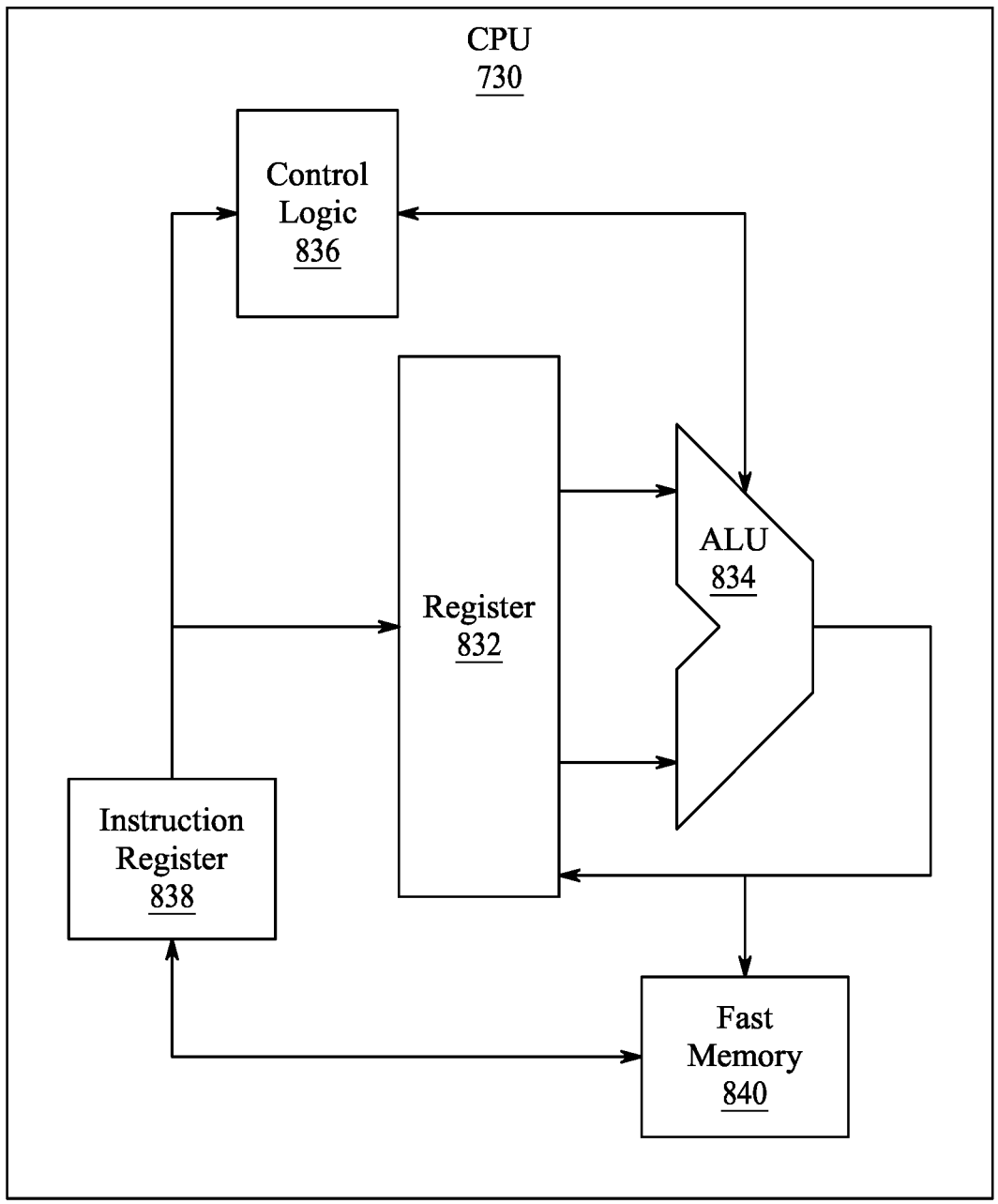
FIG. 8 is an exemplary schematic diagram of a processor used with the computing system, according to aspects of the present disclosure.

For example, FIG. 8 shows one implementation of CPU 730. In one implementation, the instruction register 838 retrieves instructions from the fast memory 840. At least part of these instructions is fetched from the instruction register 838 by the control logic 836 and interpreted according to the instruction set architecture of the CPU 730. Part of the instructions can also be directed to the register 832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 830 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x56 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 9:
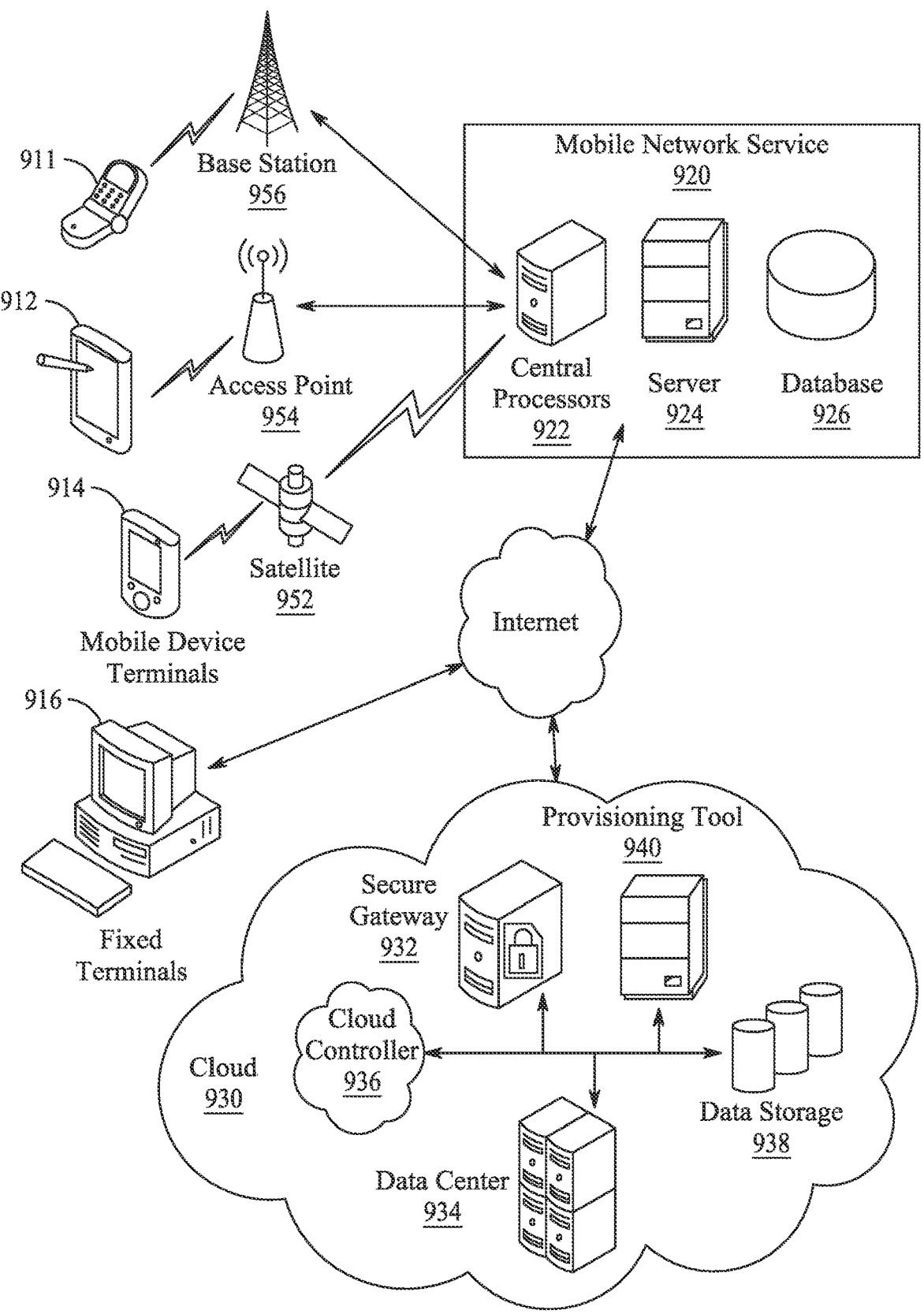
FIG. 9 is an illustration of a non-limiting example of distributed components which may share processing with the controller, according to aspects of present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 9 illustrates client devices including smart phone 911, tablet 912, mobile device terminal 914 and fixed terminals 916. These client devices may be commutatively coupled with a mobile network service 920 via base station 956, access point 954, satellite 952 or via an internet connection. Mobile network service 920 may comprise central processors 922, server 924 and database 926. Fixed terminals 916 and mobile network service 920 may be commutatively coupled via an internet connection to functions in cloud 930 that may comprise security gateway 932, data center 934, cloud controller 936, data storage 938 and provisioning tool 940.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for distributing geophones around a seismic data source, the method comprising:
   distributing one or more first geophones in a first region in which the seismic data source is located, each of the first geophones including a first piezoelectric system; and
   distributing one or more second geophones in a second region surrounding the first region, each of the second geophones including a solar cell, a second piezoelectric system and a thermoelectric generator,
   wherein each of the second geophones comprise:
   a housing having a top surface, a flat bottom surface, and a lateral surface connecting the top surface to the bottom surface, wherein the lateral surface is in the form of a cylinder having a top circumferential edge at a top junction of the top surface and a bottom circumferential edge at a bottom junction of the bottom surface with a bottom end of the cylinder;
   a spike provided on the bottom surface of the housing;
   a sensor provided inside the housing, the sensor configured to sense seismic data;
   a processor provided inside the housing and coupled to the sensor, the processor configured to process the seismic data;
   a transceiver provided inside the housing and coupled to the processor, the transceiver configured to transmit the processed seismic data and receive radio frequency (RF) signals wirelessly; and
   a power device coupled to the sensor, the processor and the transceiver, the power device configured to harvest energy from an environment where the geophone is located to power the sensor, the processor and the transceiver;
   wherein the solar cell is disposed on the top surface and a portion of the lateral surface of the housing;
   wherein the second piezoelectric system is disposed on the top circumferential edge of the housing adjacent to the top surface and extends outward from the housing perpendicular to the lateral surface; and
   wherein the thermoelectric generator is disposed on the bottom surface of the housing and a surface of the spike.

2. The method of claim 1, wherein the power device of the second geophone further includes an antenna provided on the top surface of the housing and coupled to the transceiver, the antenna configured to receive the RF signals.

3. The method of claim 2, wherein the second geophone further comprises:
   a rectifier coupled to the antenna, the rectifier configured to convert the RF signals into direct current (DC) signals; and
   a matching circuit coupled between the antenna and the rectifier, the matching circuit configured to match an impedance of the antenna to the rectifier.

4. The method of claim 3, wherein the matching circuit includes a shunt inductor.

5. The method of claim 3, wherein the matching circuit includes an LC circuit.

6. The method of claim 3, wherein the matching circuit includes a transformer.

7. The method of claim 1, wherein the power device of the second geophone further includes an electrostatic/electromagnetic system provided inside the housing.

8. The method of claim 7, wherein the electrostatic/electromagnetic system has a resonant frequency that is tunable.

9. The method of claim 1, wherein the solar cell of the second geophone includes a copper-backed solar panel.

10. The method of claim 1, wherein the piezoelectric system of the second geophone has a resonant frequency that is tunable.

11. The method of claim 1, wherein the thermoelectric generator of the second geophone is further provided on a lateral surface of the housing.

12. The method of claim 1, wherein the housing of the second geophone is cylindrical.

13. The method of claim 1, wherein the second geophone further comprises a photocell provided on the top surface of the housing.

14. The method of claim 1, wherein the second geophone further comprises a power storage unit coupled between the sensor, the processor and the transceiver and the power device, the power storage unit configured to store the energy harvested by the power device.

15. The method of claim 1, further comprising
distributing in the first region one or more third geophones each including an electrostatic/electromagnetic system.

16. The method of claim 1, further comprising
distributing in the second region one or more fourth geophones each including an antenna.

* * * * *